US012630354B2

(12) United States Patent
Yi

(10) Patent No.: US 12,630,354 B2
(45) Date of Patent: May 19, 2026

(54) STORAGE CONTAINER

(71) Applicant: Xiao Fei Yi, Burnaby (CA)

(72) Inventor: Xiao Fei Yi, Burnaby (CA)

(*) Notice: Subject to any disclaimer, the term of this patent is extended or adjusted under 35 U.S.C. 154(b) by 0 days.

(21) Appl. No.: 18/735,559

(22) Filed: Jun. 6, 2024

(65) Prior Publication Data

US 2025/0376320 A1 Dec. 11, 2025

(51) Int. Cl.

| | |
|---|---|
| ***B65D 85/62*** | (2006.01) |
| ***A45C 11/32*** | (2006.01) |
| ***B65D 25/04*** | (2006.01) |
| ***B65D 55/14*** | (2006.01) |
| ***G07D 11/125*** | (2019.01) |
| *A45C 1/06* | (2006.01) |

(52) U.S. Cl.

CPC .............. *B65D 85/62* (2013.01); *A45C 11/32* (2013.01); *B65D 25/04* (2013.01); *B65D 55/14* (2013.01); *G07D 11/125* (2019.01); *A45C 2001/065* (2013.01); *B65D 2555/02* (2013.01)

(58) Field of Classification Search

CPC ........ B65D 85/62; B65D 25/04; B65D 55/14; B65D 2555/02; G07D 11/125; A45C 11/18; A45C 11/182; A45C 11/325; A45C 11/326; A45C 2001/065; A45C 2001/083; A45C 11/32

See application file for complete search history.

(56) References Cited

U.S. PATENT DOCUMENTS

| | | | | | |
|---|---|---|---|---|---|
| 415,457 | A * | 11/1889 | Hart | A45C 11/18 | 312/61 |
| 417,166 | A * | 12/1889 | Geisenheimer | A45C 11/182 | 312/61 |
| 476,005 | A * | 5/1892 | Davis | A45C 11/18 | 462/47 |
| 495,067 | A * | 4/1893 | Sillcocks, Jr. | A45C 11/18 | 206/39 |
| 912,804 | A * | 2/1909 | Brush | A45C 11/18 | 206/39.6 |
| 1,759,980 | A * | 5/1930 | Ecker, Jr. | A45C 11/18 | 206/39.6 |
| 3,286,823 | A * | 11/1966 | Gillespie | A45C 11/18 | 312/61 |
| 5,740,624 | A * | 4/1998 | Baseley | A45C 11/182 | 40/27.5 |

(Continued)

*Primary Examiner* — William L Miller

(74) *Attorney, Agent, or Firm* — Orin Del Vecchio

(57) ABSTRACT

A storage container that is configured to receive, store and lock items such as but not limited to paper currency and credit cards. The invention includes a main compartment having an interior volume defined by integrally formed bottom, sidewalls, front wall, rear wall and top member. The top member is hingedly secured providing access to the interior volume of the main compartment. A slot is formed in the rear wall wherein the slot has adjacent thereto a credit card retention member disposed within the interior volume of the main compartment. A key compartment is present adjacent to the main compartment and includes a key slot formed in the bottom configured to have key journaled therethrough. A lock compartment is present adjacent to key compartment wherein the lock compartment is configured to house a lock therein. The top member includes a recessed rolled rear edge hingedly coupled intermediate the sidewalls.

17 Claims, 4 Drawing Sheets

(56) References Cited

U.S. PATENT DOCUMENTS

| | | | | | |
|---|---|---|---|---|---|
| 5,799,774 | A * | 9/1998 | Dengel | A45C 1/06 | 206/38.1 |
| 5,950,816 | A * | 9/1999 | Reid | A45C 1/00 | 206/38.1 |
| 6,450,400 | B1 * | 9/2002 | Savoir, Jr. | E05B 35/008 | 220/345.3 |
| 6,490,893 | B1 * | 12/2002 | Benion | E05G 1/005 | 109/45 |
| 6,962,253 | B1 * | 11/2005 | McZeek | A45C 1/12 | 206/37 |
| 7,830,672 | B1 * | 11/2010 | Kitchen | H05K 9/0007 | 361/818 |
| 8,730,043 | B1 * | 5/2014 | Guincho | G06Q 20/363 | 340/5.83 |
| 8,998,075 | B1 * | 4/2015 | Merriweather | E05G 1/005 | 232/1 D |
| 9,907,375 | B1 * | 3/2018 | Kitchen | A45C 1/06 | |
| 2001/0032690 | A1 * | 10/2001 | Gribovsky | A45C 11/182 | 150/137 |
| 2002/0170473 | A1 * | 11/2002 | Fettis | G08B 15/00 | 109/23 |
| 2002/0186131 | A1 * | 12/2002 | Fettis | G08B 13/06 | 340/568.1 |
| 2003/0057112 | A1 * | 3/2003 | Keough | A45C 11/182 | 206/39.4 |
| 2005/0183974 | A1 * | 8/2005 | Wong | A45C 11/18 | 206/308.1 |
| 2007/0284264 | A1 * | 12/2007 | Davis | A45C 11/182 | 206/39 |
| 2009/0101255 | A1 * | 4/2009 | Long | A45C 11/182 | 150/147 |
| 2010/0320100 | A1 * | 12/2010 | Holden | A45F 3/14 | 206/232 |
| 2013/0001105 | A1 * | 1/2013 | Mongan | A45C 13/002 | 206/38 |
| 2018/0141714 | A1 * | 5/2018 | Kanbar | A24F 15/12 | |
| 2021/0282518 | A1 * | 9/2021 | Schepper | A45C 11/182 | |
| 2022/0363458 | A1 * | 11/2022 | Bogdziewicz | B65D 50/046 | |
| 2025/0375007 | A1 * | 12/2025 | Kitchen | A45C 1/06 | |

* cited by examiner

STORAGE CONTAINER

FIELD OF THE INVENTION

The present invention relates generally to storage compartments, more specifically but not by way of limitation, a portable storage container for items such as but not limited to paper currency and credit cards wherein the present invention includes features such as but not limited to an angled slot for credit card insertion, an isolated key slot and a lock compartment integrally formed with the storage container.

BACKGROUND

Paper currency is heavily utilized in many industries as well as by individuals. Paper currency is utilized in large amounts in various entertainment industries such as but not limited to gambling. Gambling and entertainment providers utilize paper currency at places such as but not limited to casino table games wherein the currency is employed to place wagers on the outcome of the table games. Management of the currency at a multitude of table game locations is a significant challenge. Currency is typically collected at the table games through the evening and is transported to a central location wherein the currency is most often transported in various containers and is sometimes placed in a folded position.

Many individuals will utilize a credit card to establish an amount of money with which the player choses to utilize to engage in play of games. Most often, the casino or facility will retain the credit card until the player has decided to halt play wherein subsequent halting of play the credit card may be utilized to resolve any monies owed to the casino or facility. Conventional currency transport containers do not provide for locking in a separate compartment of credit cards. Furthermore, many traditional currency transport containers do not have an ability to lock inhibiting access to the interior volume.

Accordingly, there is a need for a currency and credit card transport and storage container wherein the present invention provides an ability to receive, store and lock paper currency as well as credit cards.

SUMMARY OF THE INVENTION

It is the object of the present invention to provide a paper currency and credit card container that is configured to provide locked storage wherein the present invention includes a main compartment having a bottom integrally formed with side walls forming an interior volume.

Another object of the present invention is to provide a lockable container that is configured to receive, store and inhibit access to objects disposed therein wherein the rear wall of the main compartment includes a slot formed therein configured to have credit cards journaled therethrough.

A further object of the present invention is to provide a paper currency and credit card container that is configured to provide locked storage wherein the slot further includes a credit card retention member adjacent thereto disposed within the interior volume of the main compartment so as to inhibit credit cards from egressing from the interior volume ensuing deposit therein.

Yet a further object of the present invention is to provide a lockable container that is configured to receive, store and inhibit access to objects disposed therein wherein the bottom of the main compartment includes a key slot formed therein that is configured to have a key journaled therethrough for placement into the key compartment.

Still another object of the present invention is to provide a paper currency and credit card container that is configured to provide locked storage wherein the front wall of the main compartment includes an opening providing access to a lock storage area.

An additional object of the present invention is to provide a lockable container that is configured to receive, store and inhibit access to objects disposed therein wherein the top member of the main compartment is hingedly secured having a recessed rear edge.

Yet a further object of the present invention is to provide a paper currency and credit card container that is configured to provide locked storage wherein the top member includes a tab member integrally formed on the bottom surface thereof extending downward therefrom.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
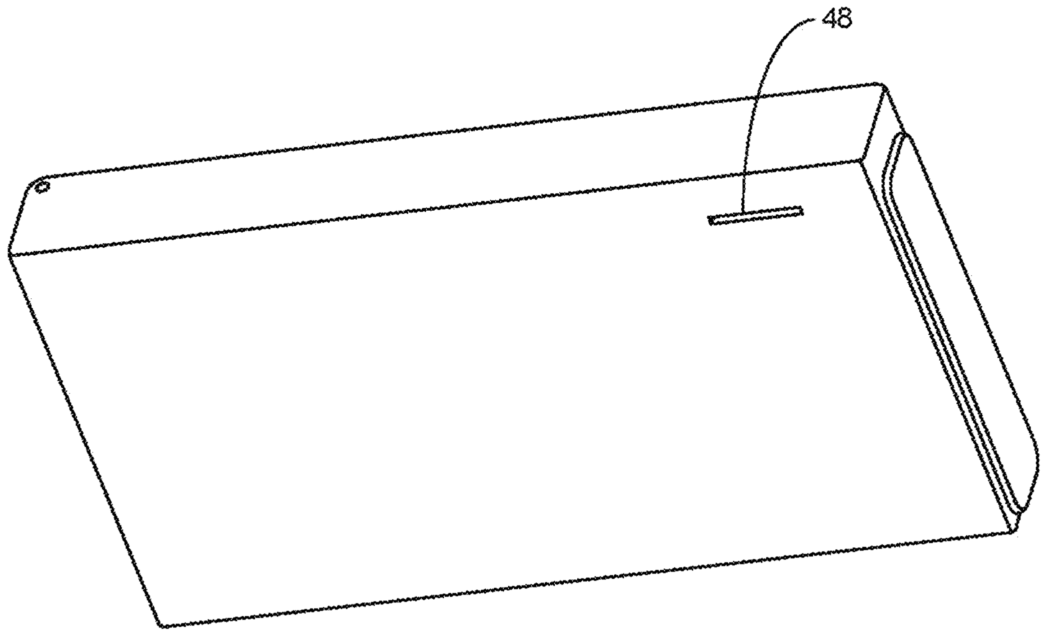
FIG. 1 is a bottom perspective view of the present invention.
Figure 2:
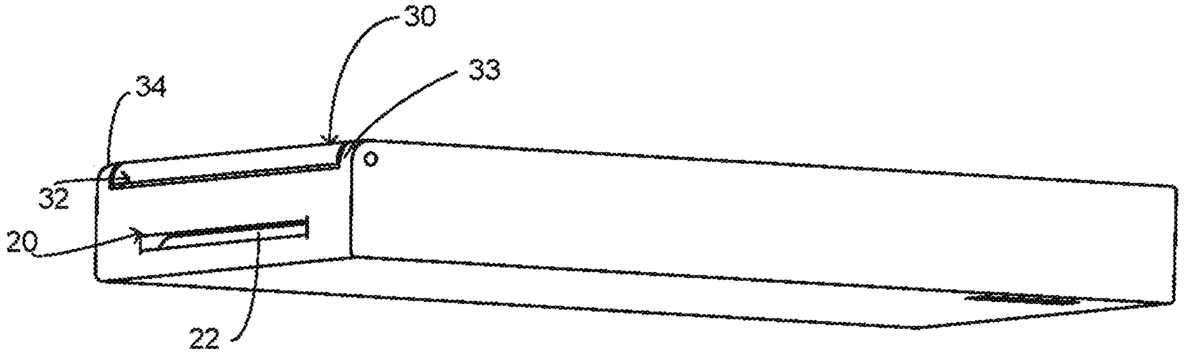
FIG. 2 is rear perspective view of the present invention.
Figure 3:
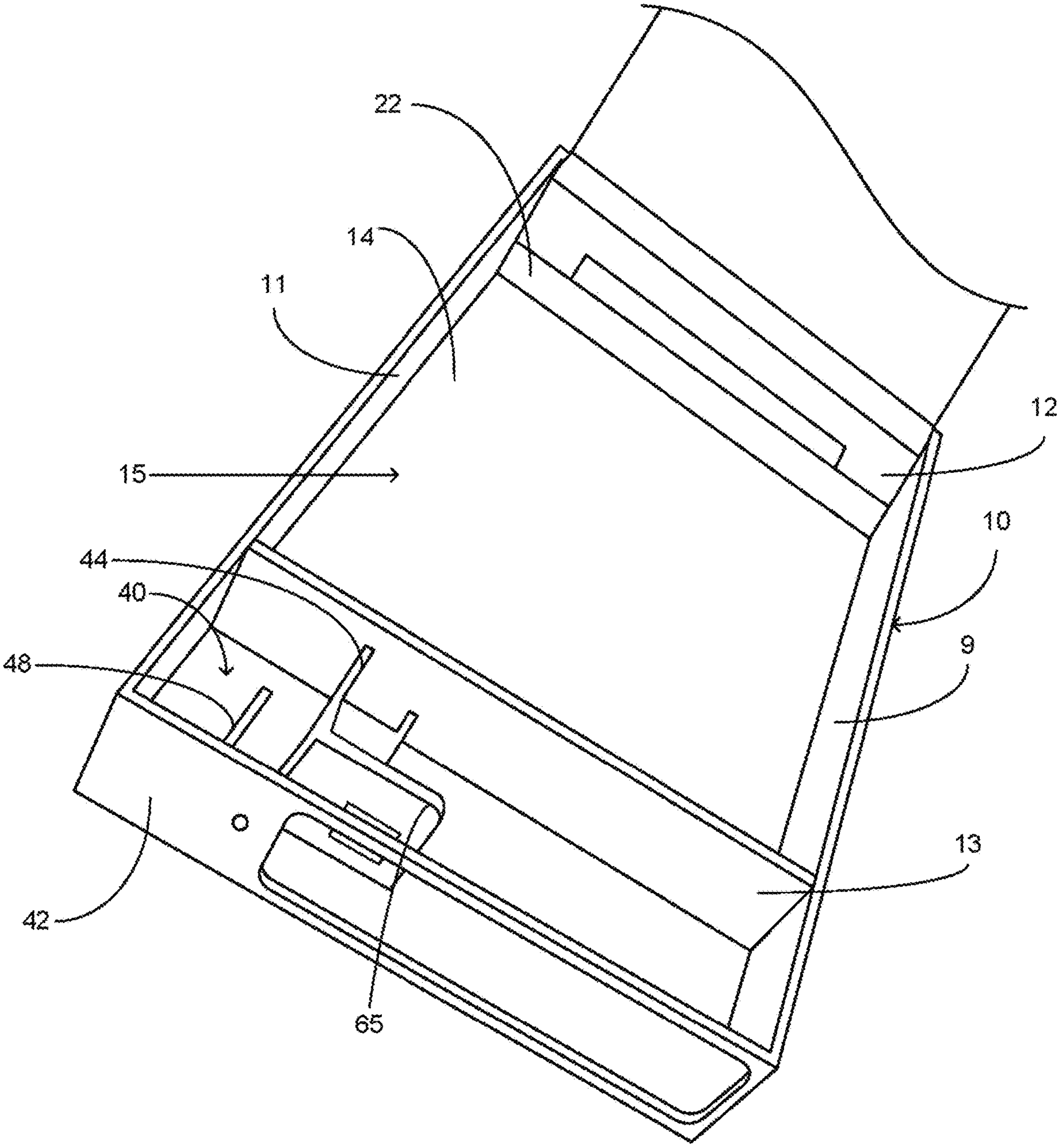
FIG. 3 is a top view of the present invention with the top member being in an open position.
Figure 4:
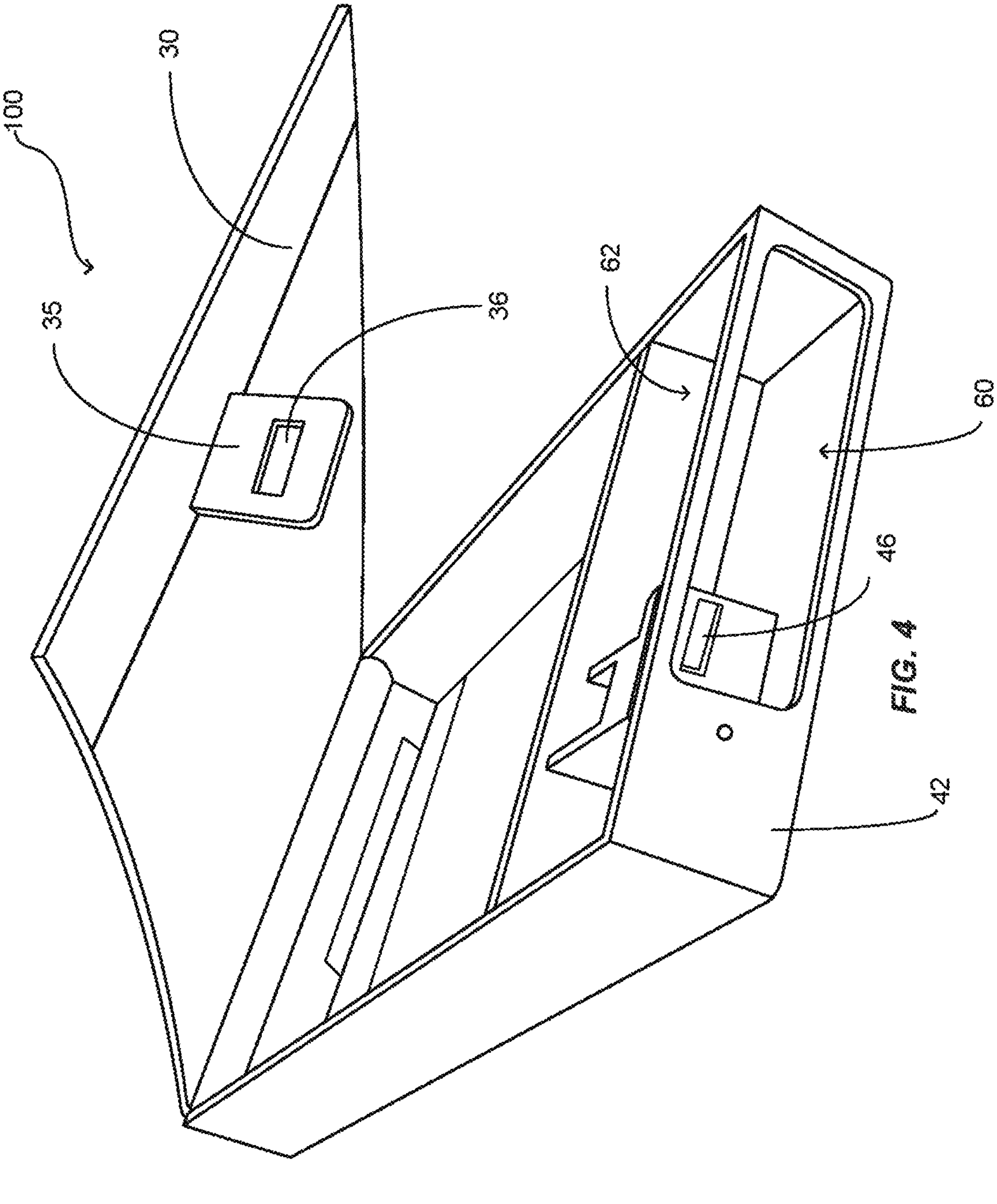
FIG. 4 is a front perspective of the present invention with the top member being in an open position.
Figure 5:
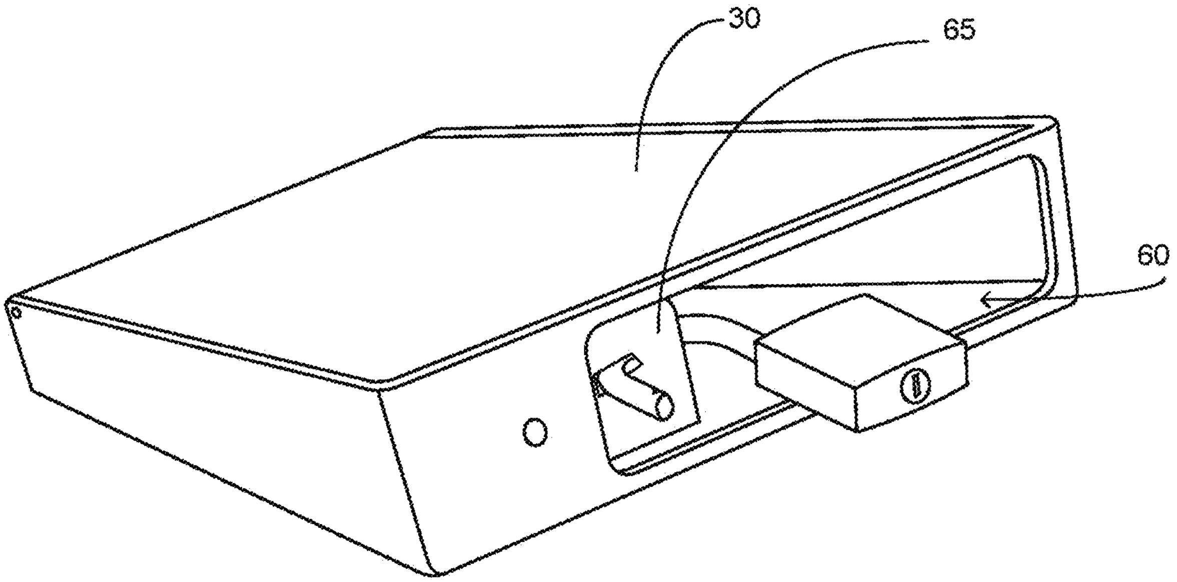
FIG. 5 is a front view with an exemplary lock in an open position.
Figure 6:
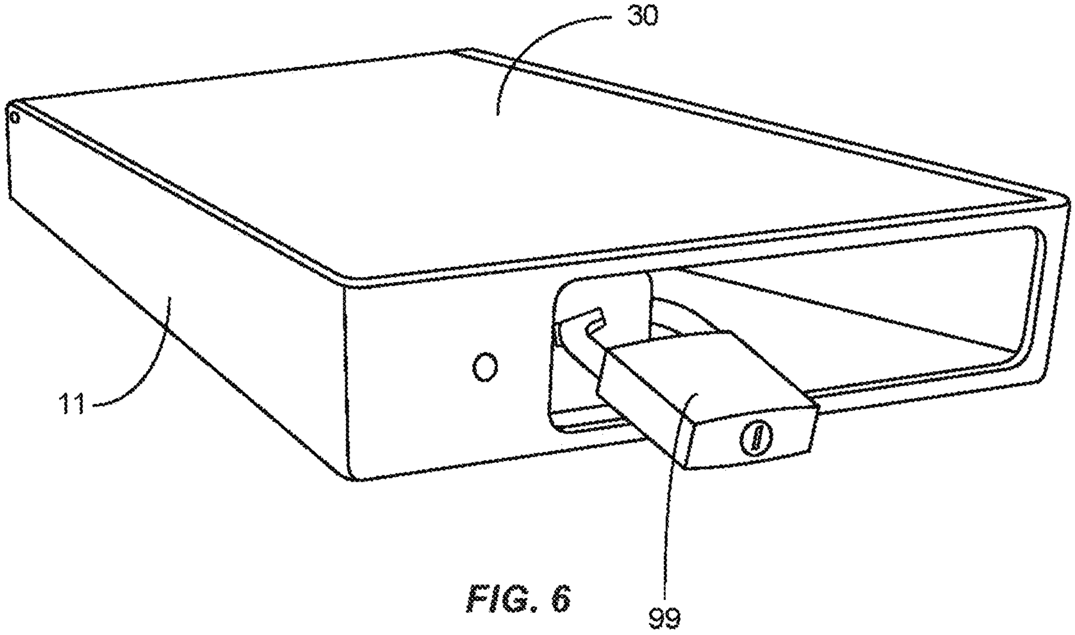
FIG. 6 is a front view with an exemplary lock in a closed position.

Referring now to the drawings submitted herewith, wherein various elements depicted therein are not necessarily drawn to scale and wherein through the views and figures like elements are referenced with identical reference numerals, there is illustrated a storage container 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to the Figures submitted herewith, the storage container 100 is manufactured from a durable rigid material such as but not limited to metal. The storage container 100 is rectangular in shape having a main compartment 10 that is formed via sidewalls 9,11 rear wall 12, front wall 13 integrally formed with bottom 14 forming the interior volume 15 of the main compartment 10. It should be understood within the scope of the present invention that the storage container 100 could be provided in at least three sizes. It is further contemplated within the scope of the present invention that the three sizes of the storage container 100 could be progressively from a small size to a large size. It is further contemplated within the scope of the present invention that the dimensions for each size of the storage container 100 could vary based on functional requirements. While not particularly illustrated herein, it is contemplated within the scope of the present invention that the storage container 100 could have additional support members along the rear wall 12 and front wall 13 to proximate the corners and further could be incorporated into the top member 30 in order to inhibit prying or bending thereof.

The rear wall 12 includes credit card slot 20 formed therein wherein the credit card slot 20 is rectangular in shape extending substantially across the rear wall 12. Immediately adjacent to the credit card slot 20 disposed within the interior volume 15 is credit card retention member 22. The credit card retention member 22 is integrally formed on the bottom 14 extending upward therefrom. The credit card retention member 22 is angularly oriented wherein the credit card retention member 22 angles upward from the bottom 14 angling towards the front wall 13. The angular orientation of the credit card retention member 22 permits insertion of credit cards into the credit card slot 20 and inhibits the credit cards from egressing from the interior volume 15 via the credit card slot 20. The upper edge of the credit card retention member 22 is positioned such that it is higher than the credit card slot 20.

The top member 30 is hingedly coupled to the sidewalls 9,11 proximate the rear wall 12. The top member 30 has a rolled rear edge 32 integrally formed therewith wherein the rolled rear edge extends downward into the rear wall 12. The rolled rear edge 32 sits recessed between posterior corners 33,34 of the sidewalls 9, 11. The recessed position of the rolled rear edge 32 inhibits access with a pry tool or similar object so as to inhibit unwanted access to the interior volume 15. The top member 30 further includes tab member 35 integrally formed on the lower surface thereof. Tab member 35 is perpendicular to the top member 30 extending downward therefrom. Tab member 35 includes aperture 36 wherein aperture 36 aligned with aperture 46 when the top member 30 is in its closed position allowing exemplary lock 99 to be operably coupled thereto.

The storage container 100 includes key compartment 40 formed within the interior volume 15 of the main compartment 10. The key compartment 40 is intermediate the front wall 13 and outer wall 42 and is further defined by interior side wall 44. The interior side wall 44 is perpendicular to the outer wall 42 and front wall 13. The key compartment 40 has key slot 48 formed in the bottom 14 allowing a key to be journaled therethrough for storage within the key compartment 40. It is contemplated within the scope of the present invention that the interior side wall 44 could be constructed in alternate manners and could further include additional walls and/or element to provide support during use of the storage container 100.

The outer wall 42 includes opening 60 providing access to the lock compartment 62. Lock compartment 62 is intermediate the outer wall 42 and front wall 13 and is of suitable size to accommodate therein exemplary lock 99. Front wall 13 is constructed to be approximately one millimeter lower in height than sidewalls 9, 11 to ensure closure of top member 30. The lock compartment 62 has an interior volume operable to receive and store therein the exemplary lock 99 in its second position wherein the lock 99 is disposed within the interior volume of the lock compartment. Lock compartment 62 includes securing wall 65 wherein securing wall 65 is integrally formed with the bottom 14 extending upward therefrom. The securing wall 65 includes aperture 46 wherein as discussed herein aligns with aperture 36 to receive the shank of exemplary lock 99. While not illustrated herein, it is contemplated within the scope of the present invention that the opening 60 could further include an upwardly protruding lip member along the bottom edge thereof so as to assist in maintaining the lock 99 within the lock compartment 62.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A storage container configured to receive, store and secure paper currency and credit cards wherein the storage container comprises:

a main compartment, said main compartment having a bottom integrally formed sidewalls forming an interior volume, said main compartment further having a top member hingedly secured thereto covering an opening providing access to the interior volume, said main compartment further having a rear wall and a front wall, said top member being movable between an open position and a closed position;

a credit card slot, said credit card slot being formed in said rear wall, said credit card slot configured to have a credit card journaled therethrough for deposit into said interior volume of main compartment;

a credit card retention member, said credit card retention member being disposed within said interior volume of said main compartment, said credit card retention member extending upward from an upper surface of said bottom, said credit card retention member being adjacent said credit card slot;

an outer wall, said outer wall being parallel with said front wall and defining a void therebetween, said outer wall being contiguous with said sidewalls and said bottom;

a key compartment, said key compartment being present intermediate said front wall and said outer wall within said void, said key compartment further having a slot formed through said bottom, said slot configured to have journaled therethrough a key for deposit into an interior volume of said key compartment.

2. The storage container configured to receive, store and secure paper currency and credit cards as recited in claim 1, wherein said top member further includes a recessed rolled rear edge, said recessed rolled rear edge being hingedly secured intermediate said sidewalls.

3. The storage container configured to receive, store and secure paper currency and credit cards as recited in claim 2, wherein said top member further includes a tab member, said tab member extending downward from said top member towards said interior volume of said main compartment, said tab member being perpendicular with said top member.

4. The storage container configured to receive, store and secure paper currency and credit cards as recited in claim 3, wherein said tab member further includes an aperture.

5. The storage container configured to receive, store and secure paper currency and credit cards as recited in claim 4, and further including a lock compartment, said lock compartment being present intermediate said front wall and said outer wall within said void, said lock compartment having an interior volume configured to receive and store a lock therein.

6. The storage container configured to receive, store and secure paper currency and credit cards as recited in claim 5, wherein said outer wall includes an opening, said opening being adjacent said lock compartment, said opening configured to facilitate a lock being moved into the interior volume of said lock compartment.

7. The storage container configured to receive, store and secure paper currency and credit cards as recited in claim 6, wherein said lock compartment further includes a securing wall formed therein, said securing wall extending upward from said bottom, said securing wall having an aperture, said aperture of said securing wall configured to align with said aperture of said tab member ensuing said top member being placed in the closed position.

8. The storage container configured to receive, store and secure paper currency and credit cards as recited in claim 7, wherein the credit card retention member is angularly oriented such that the credit card retention member is angled away from said rear wall.

9. The storage container configured to receive, store and secure paper currency and credit cards as recited in claim 8, wherein the storage container is rectangular in shape.

10. A storage container configured to receive, store and secure paper currency and credit cards wherein the storage container comprises:

a main compartment, said main compartment having a bottom integrally formed with sidewalls forming an interior volume, said main compartment further having a top member hingedly secured thereto covering an opening providing access to the interior volume, said main compartment further having a rear wall and a front wall, said top member being movable between an open position and a closed position;

a credit card slot, said credit card slot being formed in said rear wall, said credit card slot configured to have a credit card journaled therethrough for deposit into said interior volume of main compartment;

a credit card retention member, said credit card retention member being disposed within said interior volume of said main compartment, said credit card retention member extending upward from an upper surface of said bottom, said credit card retention member being adjacent said credit card slot and angularly oriented such that the credit card retention member is angled away from said rear wall;

an outer wall, said outer wall being parallel with said front wall and defining a void therebetween, said outer wall being contiguous with said sidewalls and said bottom; and a key compartment, said key compartment being present intermediate said front wall and said outer wall within said void, said key compartment further having a slot formed through said bottom, said slot configured to have journaled therethrough a key for deposit into an interior volume of said key compartment.

11. The storage container configured to receive, store and secure paper currency and credit cards as recited in claim 10, wherein said top member further includes a recessed rolled rear edge, said recessed rolled rear edge being hingedly secured intermediate said sidewalls.

12. The storage container configured to receive, store and secure paper currency and credit cards as recited in claim 11, wherein said top member further includes a tab member, said tab member extending downward from said top member towards said interior volume of said main compartment, said tab member being perpendicular with said top member.

13. The storage container configured to receive, store and secure paper currency and credit cards as recited in claim 12, wherein said tab member further includes an aperture.

14. The storage container configured to receive, store and secure paper currency and credit cards as recited in claim 13, and further including a lock compartment, said lock compartment being present intermediate said front wall and said outer wall within said void, said lock compartment having an interior volume configured to receive and store a lock therein.

15. The storage container configured to receive, store and secure paper currency and credit cards as recited in claim 14, wherein said outer wall includes an opening, said opening being adjacent said lock compartment, said opening configured to facilitate a lock being moved into the interior volume of said lock compartment.

16. The storage container configured to receive, store and secure paper currency and credit cards as recited in claim 15, wherein said lock compartment further includes a securing wall formed therein, said securing wall extending upward from said bottom, said securing wall having an aperture, said aperture of said securing wall configured to align with said aperture of said tab member ensuing said top member being placed in the closed position.

17. The storage container configured to receive, store and secure paper currency and credit cards as recited in claim 16, wherein the storage container is rectangular in shape.

* * * * *